United States Patent [19]

Yamasaki et al.

[11] Patent Number: 5,185,060
[45] Date of Patent: Feb. 9, 1993

[54] FILM EVAPORATOR

[75] Inventors: Tadashige Yamasaki, Osaka; Hirotoshi Handa, Kakogawa, both of Japan

[73] Assignee: Shinko Pantec Co., Ltd., Japan

[21] Appl. No.: 499,037

[22] Filed: Mar. 26, 1990

[30] Foreign Application Priority Data

Jul. 26, 1989 [JP] Japan .................. 1-194529

[51] Int. Cl.$^5$ .............................................. B01D 1/24
[52] U.S. Cl. ................................ 159/13.1; 159/25.1; 159/49; 165/115; 202/175; 202/236; 202/265; 203/89
[58] Field of Search ............... 202/236, 265, 175; 159/13.1, 25.1, 2.2, 49; 203/89; 165/115, 109.1; 366/144, 342, 343, 323; 425/203

[56] References Cited

U.S. PATENT DOCUMENTS

| | | | |
|---|---|---|---|
| 2,774,415 | 12/1956 | Belcher | 159/6.2 |
| 3,334,680 | 8/1967 | McManus | 159/13.1 |
| 3,357,477 | 12/1967 | Monty | 159/13.1 |
| 3,357,478 | 12/1967 | Donovan et al. | 159/13.1 |
| 3,423,782 | 1/1969 | Klösel | 159/13.1 |
| 3,428,106 | 2/1969 | Johnston | 159/6.2 |
| 3,630,045 | 12/1971 | Lunde | 62/320 |
| 3,633,645 | 1/1972 | Gorbei et al. | 159/13.2 |
| 3,797,550 | 3/1974 | Latinen | 159/2.2 |
| 4,504,361 | 3/1985 | Tkac et al. | 159/13.1 |
| 4,683,026 | 7/1987 | Feres | 159/13.1 |

FOREIGN PATENT DOCUMENTS

| | | | |
|---|---|---|---|
| 277883 | 5/1913 | Fed. Rep. of Germany. | |
| 1428397 | 10/1988 | U.S.S.R. | 159/13.1 |

*Primary Examiner*—Virginia Manoharan
*Attorney, Agent, or Firm*—Marshall, O'Toole, Gerstein, Murray & Bicknell

[57] ABSTRACT

A film evaporator formed by a cylindrical body section (50) with a heating jacket (53) and angled scraping blades (84) mounted on a rotatable shaft (76) to move the thickened material downwardly through the evaporator. Below the body section (50) is an inverted frustoconical section (62) containing inclined scraping blades (86) also mounted on the shaft (76) and a smaller diameter lower body section (64) through which the thickened product can be discharged by a screw (93) of opposite hand to the scraping blades (84). The screw (93) is carried on a lower shaft (88) which is journalled to the shaft (76) so that the shafts can be rotated independently and in opposite directions.

4 Claims, 3 Drawing Sheets

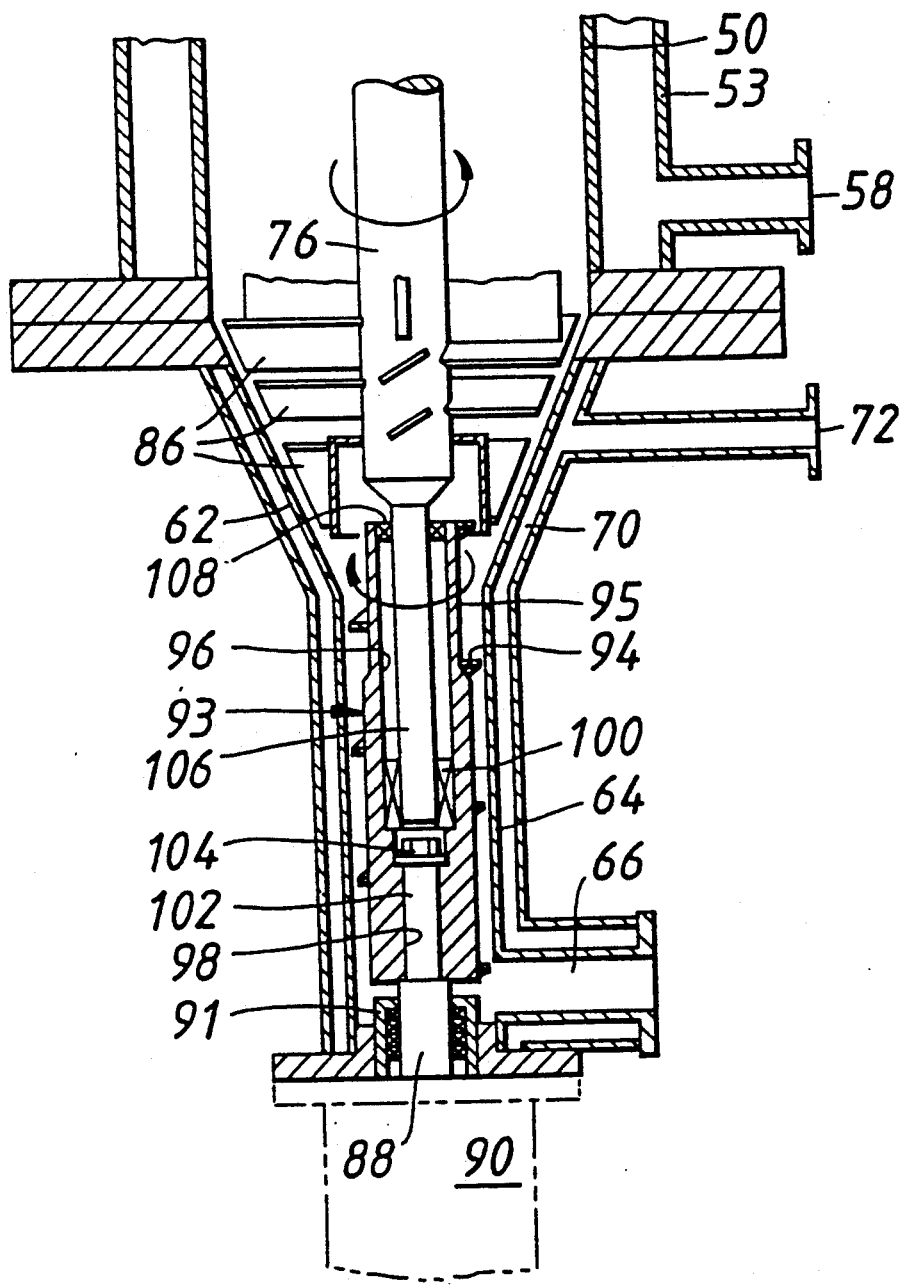

FILM EVAPORATOR

FIELD AND BACKGROUND OF THE INVENTION

This invention relates to a film evaporator which may be used for obtaining highly viscous products by evaporating and removing solvents and other volatile components from viscous liquids such as high-polymer resins formed by polymerization.

A conventional agitated film evaporator is shown schematically in FIG. 1 of the accompanying drawings. This evaporator includes a vertical, generally cylindrical jacket 10 surrounding a sealed vessel 12 with a circumferential space 14 formed between them. The jacket has nozzles 16 and 18 for a heating fluid to flow through the space 14 and heat the peripheral wall of vessel 12. The inside of vessel 12 can be decompressed by connecting its vapor outlet nozzle 20 to a vacuum source via a condenser (not shown) outside the evaporator.

A vertical shaft 22 extends into the vessel 12 and is journalled by an upper sealed bearing 24 and a lower bearing 26, which is supported by a radial support 28 fixed to the vessel 12. The shaft 22 can be rotated by a motor (not shown) situated outside the evaporator. To the shaft 22 are fixed a distributor 30 having helical blades 31 and a film forming unit 32 having agitating blades 34 arranged under the distributor.

The vessel 12 can be supplied through an inlet nozzle 36 with a viscous liquid, which is dispersed by the distributor blades 31 over the inner surface of vessel 12. The descending liquid is then spread as a film on this surface by the agitating blades 34 in order to promote the evaporation of the volatile components. The vapor is discharged through the nozzle 20, while the processed liquid is discharged by a gear pump 38 through an outlet 40.

Generally, this type of film evaporator enhances evaporation with the static pressure of liquid being reduced by filming under decompressed condition. This can reduce the evaporation temperature and reduce the thermal influence on the liquid. The film is agitated, scraped and moved down by the agitating blades 34 while it is being formed. Consequently, highly viscous liquids can also be processed.

However, such conventional evaporators have certain disadvantages which are more noticeable when the liquid viscosity is higher. Thus, the processed highly viscous material descending on the inner vessel surface sticks to and collects on the lower bearing support 28 extending from this surface. If the accumulating material contacts the blades 34, the rotating system may lose its mechanical balance and rotation may be prevented.

Also, the collected material may change in quality under the prevailing thermal conditions during collection. If the changed material then becomes detached from the support 28 and mixes with the material being processed, the product quality is lowered. Further, below the film former 32 the highly viscous material descends only slowly under gravity to the pump 38. The material therefore remains within the vessel 12 for a long time, so that the material may deteriorate in quality.

The present invention seeks to provide a film evaporator which does not exhibit these difficulties when used with highly viscous liquids.

SUMMARY OF THE INVENTION

According to the invention, there is provided a film evaporator comprising:

a sealed vessel adapted to be decompressed and including communicating coaxially dispersed upper and lower cylindrical sections, the upper section having a feed inlet adjacent its upper end for material containing volatile components and the lower section having a residue outlet adjacent its lower end;

an upper shaft and a lower shaft both extending coaxially within the vessel and journalled by it, the shafts being separately rotatable;

film forming means attached to the upper shaft substantially within the upper section and having a plurality of agitating blades which extend radially and are inclined to the horizontal to spread the material as a film on the inner peripheral wall of the vessel and move the material downwardly;

heating means provided around the vessel to heat its wall for evaporation of the volatile components;

a screw attached coaxially to the lower shaft substantially inside the lower section to move the material downwardly; and bearing means provided between the shafts.

BRIEF DESCRIPTION OF THE DRAWINGS

The invention and the working and constructional advantages it exhibits will now be described in greater detail by way of example only with reference to the accompanying drawings, in which:

FIG. 4 is an enlarged side view in axial section of a lower part of the evaporator shown in FIG. 2.

DETAILED DESCRIPTION OF THE INVENTION

Figure 3:
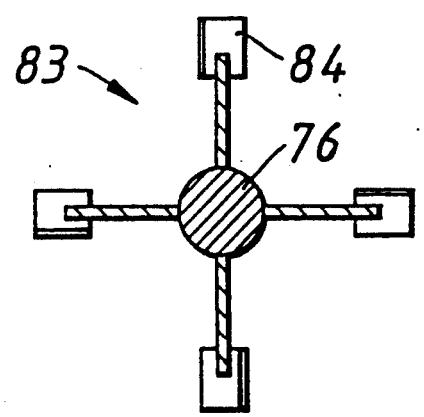
FIG. 3 is an enlarged, radially sectional view of the film forming unit of the evaporator shown in FIG. 2.
Figure 2:
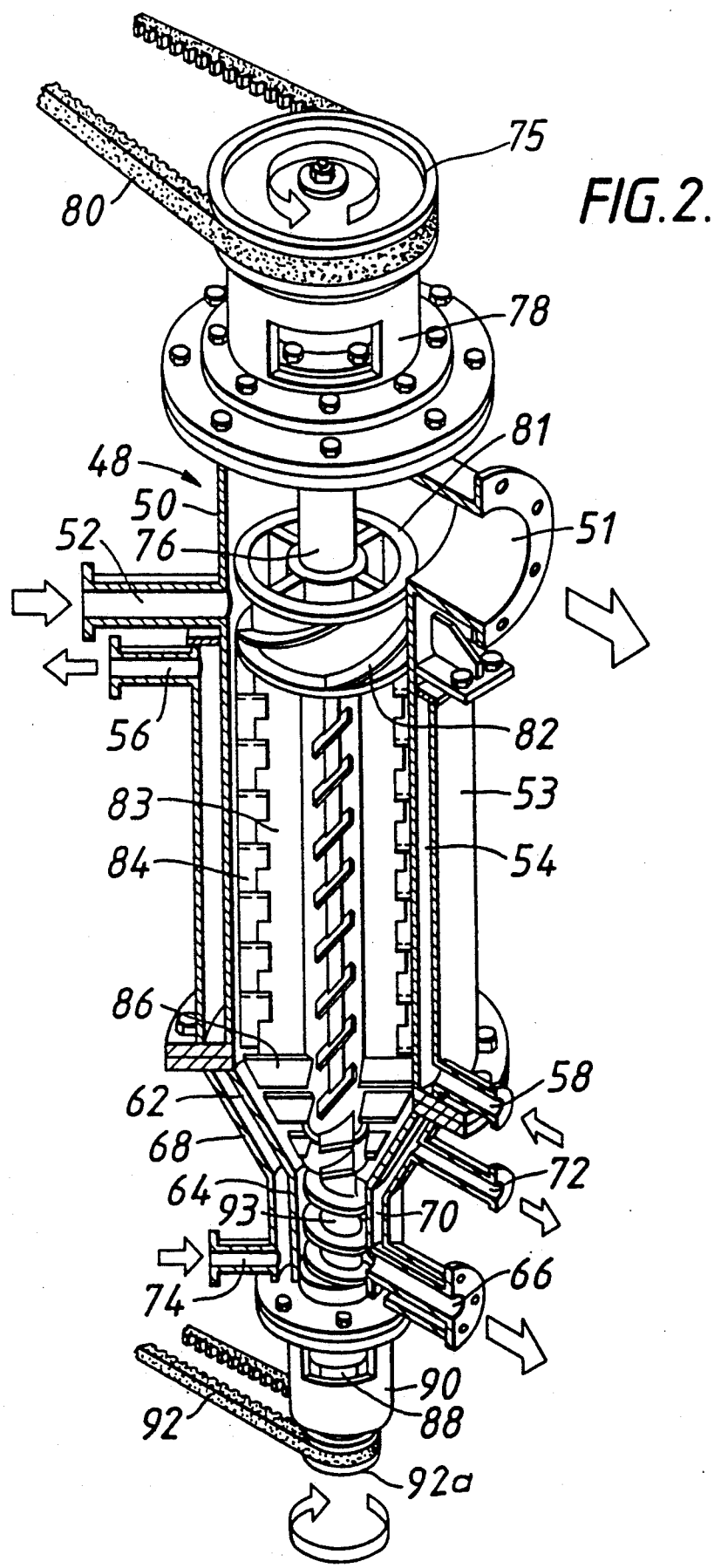
FIG. 2 is a perspective view of a film evaporator according to the invention.

With reference to FIGS. 2 to 4 of the drawings, the evaporator according to the invention includes a vertically disposed sealed vessel 48 including an upper cylindrical section 50 which is fixed to a frame (not shown). The section 50 has a vapor outlet 51 formed adjacent its top and connected to a vacuum source via a condenser (not shown) outside the evaporator in order to decompress the vessel 48. The section 50 also has a liquid inlet 52 just below the outlet 51.

The section 50 is surrounded below the outlet 51 and inlet 52 by a cylindrical jacket 53 with a circumferential space 54 formed between them. The jacket 53 has an outlet 56 and an inlet 58 for hot oil as a heating medium to flow through the space 54, so that the inner peripheral surface of section 50 serves as a heating surface for evaporation and keeping warm.

The lower part of vessel 48 includes an inverted frusto-conical section 62 terminating in a cylindrical section 64, which has a residue outlet 66 adjacent its base. These lower sections 62 and 64 are surrounded by another jacket 68 with a circumferential space 70 between them. The jacket 68 similarly has an outlet 72 and an inlet 74 for hot oil.

An upper shaft 76 extends coaxially with the vessel 48 and is journalled by a shaft closure 78 fixed to the vessel top. The shaft 76 can be rotated by a motor (not shown) via a belt 80 and a rotary pulley 75 on the shaft 76.

Figure 1:
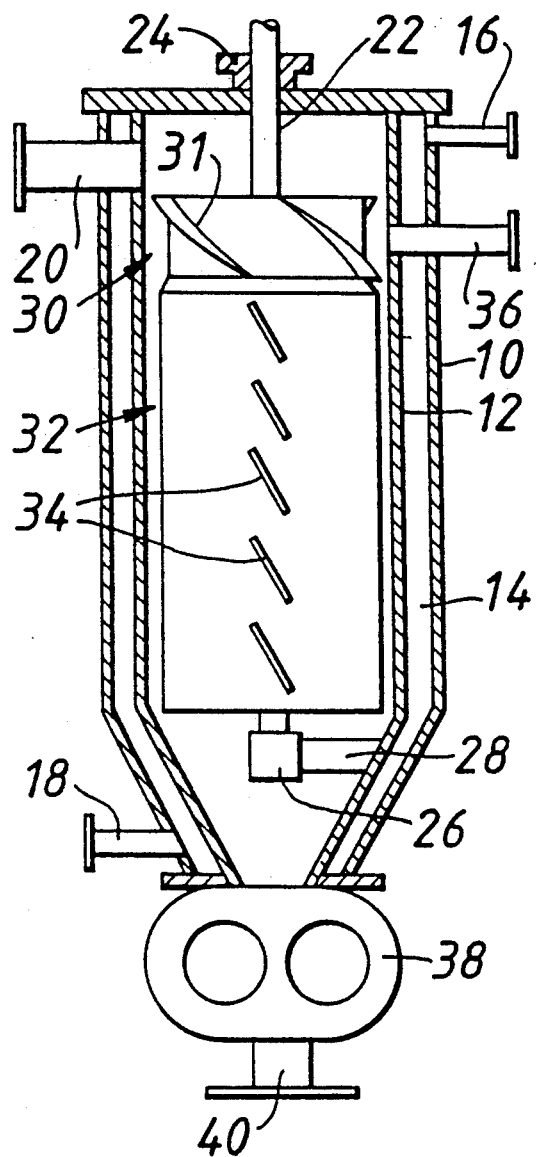
FIG. 1 is a schematic view in section of a prior art film evaporator.

A distributor 81 having helical blades 82 is fixed coaxially to the shaft 76 at the level of liquid inlet 52. Also fixed to the shaft 76 under the distributor 81 inside the upper section 50 is a film forming unit 83 (FIG. 3) having a number of radial angled agitating blades 84. The distributor 81 and film former 83 are substantially the same as those of the prior art evaporator shown in FIG. 1. Inside the frusto-conical section 62, a number of radial angled scraping blades 86 are fixed to the shaft 76.

A lower shaft 88 extends coaxially with the upper shaft 76 and is journalled by a shaft closure 90 fixed to the base of the vessel. Between the lower shaft 88 and closure 90 is a stuffing box 91 (FIG. 4) to seal the inside of vessel 48. The lower shaft 88 rotated by another motor (not shown) via a belt 92 and a rotary pulley 92 on the shaft 88 in the opposite direction to the upper shaft 76.

A screw 93 having a helical blade 94 of opposite hand to the blades 82, 84 and 86, and forming a spiral groove 95 which is deeper at its upper end, is attached to shaft 88. As shown in FIG. 4, the screw 94 has an upper bore 96 and a lower bore 98 which are respectively larger and smaller in diameter. The upper bore 96 is provided with a needle bearing 100 at its base.

The lower shaft 88 has an upper thinner end portion 102 extending coaxially through the lower bore 98 of screw 93 and fixed to it by a bolt 104, so that the screw 93 is located substantially inside the lower cylindrical vessel section 64.

The upper shaft 76 has a lower thinner end portion 106 extending into the upper bore 96 of screw 93 and supported by the bearing 100. Thus the bearing 100 supports the shaft 76 directly on the other shaft 88 and not on the vessel 48, as is clearly shown in FIG. 4, and consequently this arrangement eliminates the need for a radial support for the shaft such as that shown in FIG. 1. The top end of upper bore 96 is provided with an oil seal 108 to seal the inside of vessel 48, so that the bearing 100 is prevented from contacting the vapor or the viscous material.

In operation, a viscous liquid containing volatile components is fed into the vessel 48 through the inlet 52 and primarily dispersed over the inside of upper vessel section 50 by the distributor blades 82. The liquid then descends and is spread as a film onto the inner vessel surface by the agitating blades 84, thus promoting the evaporation of the volatile components and acting to send the liquid downward. The vapor is discharged through the outlet 51.

The processed material descends toward the screw 93, not only by gravity, but also through the assistance of scraping blades 86. The highly viscous material is effectively scraped and is fed into the upper portion of screw blade 94.

The material fed into the screw blade 94 is immediately raked by the screw blade even though it is high viscous. The material is then forced downward by the screw 94, and the residue is extruded through the outlet 66.

The upper deeper screw groove 95 and wider screw blade 94 enable a larger amount of the material to be taken into the screw blade. The lower shallower screw groove can generate sufficient discharge pressure. Thus, the overall discharge performance of screw 93 is improved.

The screw blade 94 has the same outer diameter along its entire length so that when the device is disassembled, the screw 93 can be pulled out from the bottom.

The material is always forced downward by the blades 82, 84, 86 and 94. This enables the residence time of the material within the vessel 48 to be controlled by varying the rotational speeds of shafts 76 and 88. The speeds can be individually controlled for attaining the optimum relationship between the outermost peripheral speed of agitating blades 84 and the discharge of screw 93, in order to balance the processing speed at the film former 83 and the discharging speed at the screw 93.

The viscous liquid is given a swirling motion as it is spread into a film by the agitating blades 84 running at high speed inside the upper vessel section 50. The screw blade 94 acts to oppose this swirling flow, and thus no synchronous rotation occurs. This also serves to improve the intake of highly viscous material by the scraping action of screw 94.

We claim:

1. A film evaporator comprising:
   a sealed vessel (48) for decompression and including communicating coaxially dispersed upper and lower cylindrical sections, said upper section (50) having a feed inlet (52) adjacent its upper end for material containing volatile components and said lower section (64) having a residue outlet (66) adjacent its lower end;
   an upper shaft (76) and a lower shaft (88) both extending coaxially within said vessel and journalled by it, said shafts being separately rotatable;
   said upper shaft including first rotary means and said lower shaft including second rotary means, said first and second rotary means being separately rotatable;
   film forming means (83) attached to said upper shaft substantially within said upper section and having a plurality of agitating blades (84) which extend radially and are inclined to the horizontal to spread the material as a film on the inner peripheral wall of said vessel and move the material downwardly;
   heating means (53, 54) provided around said vessel to heat said wall for evaporation of the volatile components;
   a screw (93) attached coaxially to said lower shaft substantially inside said lower section to move the material downwardly; and
   bearing means (100) provided between said shafts for supporting one of said shafts directly on the other of said shafts and not on said vessel, said vessel further including an inverted frusto-conical section (62) intermediate said upper and lower cylindrical sections (50 and 64) and a plurality of scraping blades (86) extending radially from said upper shaft (76) within said frusto-conical section, said scraping blades being inclined to the horizontal so as to move the material downwardly.

2. A film evaporator comprising:
   a sealed vessel (48) for decompression and including communicating coaxially dispersed upper and lower cylindrical sections, said upper section (50) having a feed inlet (52) adjacent its upper end for material containing volatile components and said lower section (64) having a residue outlet (66) adjacent its lower end;

an upper shaft (76) and a lower shaft (88) both extending coaxially within said vessel and journalled by it, said shafts being separately rotatable;

said upper shaft including first rotary means and said lower shaft including second rotary means, said first and second rotary means being separately rotatable;

film forming means (83) attached to said upper shaft substantially within said upper section and having a plurality of agitating blades (84) which extend radially and are inclined to the horizontal to spread the material as a film on the inner peripheral wall of said vessel and move the material downwardly;

heating means (53, 54) provided around said vessel to heat said wall for evaporation of the volatile components;

a screw (93) attache coaxially to said lower shaft substantially inside said lower section to move the material downwardly; and bearing means (100) provided between said shafts for supporting one of said shafts directly on the other of said shafts and not on said vessel, said bearing means (100) comprising a needle bearing, said vessel further including an inverted frusto-conical section (62) intermediate said upper and lower cylindrical sections (50 and 64) and a plurality of scraping blades (86) extending radially from said upper shaft (76) within said frusto-conical section, said scraping blades being inclined to the horizontal so as to move the material downwardly.

3. A film evaporator comprising:

a sealed vessel (48) for decompression and including communicating coaxially dispersed upper and lower cylindrical sections, said upper section (50) having a feed inlet (52) adjacent its upper end for material containing volatile components and said lower section (64) having a residue outlet (66) adjacent its lower end;

an upper shaft (76) and a lower shaft (88) both extending coaxially within said vessel and journalled by it, said shafts being separately rotatable;

said upper shaft including first rotary means and said lower shaft including second rotary means, said first and second rotary means being separately rotatable;

film forming means (83) attached to said upper shaft substantially within said upper section and having a plurality of agitating blades (84) which extend radially and are inclined to the horizontal to spread the material as a film on the inner peripheral wall of said vessel and move the material downwardly;

heating means (53, 54) provided around said vessel to heat said wall for evaporation of the volatile components;

a screw (93) attached coaxially to said lower shaft substantially inside said lower section to move the material downwardly; and bearing means (100) provided between said shafts for supporting one of said shafts directly on the other of said shafts and not on said vessel, said bearing means (100) comprising a needle bearing, said screw forming a spiral groove (95) which is deeper adjacent the upper end of the screw, said vessel further including an inverted frusto-conical section (62) intermediate said upper and lower cylindrical sections (50 and 64) and a plurality of scraping blades (86) extending radially from said upper shaft (76) within said frusto-conical section, said scraping blades being inclined to the horizontal so as to move the material downwardly.

4. A film evaporator comprising:

a sealed vessel (48) for decompression and including communicating coaxially dispersed upper and lower cylindrical sections, said upper section (50) having a feed inlet (52) adjacent its upper end for material containing volatile components and said lower section (64) having a residue outlet (66) adjacent its lower end;

an upper shaft (76) and a lower shaft (88) both extending coaxially within said vessel and journalled by it, said shafts being separately rotatable;

said upper shaft including first rotary means and said lower shaft including second rotary means, said first and second rotary means being separately rotatable;

film forming means (83) attached to said upper shaft substantially within said upper section and having a plurality of agitating blades (84) which extend radially and are inclined to the horizontal to spread the material as a film on the inner peripheral wall of said vessel and move the material downwardly;

heating means (53, 54) provided around said vessel to heat said wall for evaporation of the volatile components;

a screw (93) attached coaxially to said lower shaft substantially inside said lower section to move the material downwardly; and bearing means (100) provided between said shafts for supporting one of said shafts directly on the other of said shafts and not on said vessel, said bearing means (100) comprising a needle bearing, said screw (93) forming a spiral groove (95) which is deeper adjacent the upper end of the screw, said screw having a helical blade (94) inclined to the horizontal oppositely to that of said agitating blades (84) and wherein said shafts are rotatable in opposite directions, said vessel further including an inverted frusto-conical section (62) intermediate said upper and lower cylindrical sections (50 and 64) and a plurality of scraping blades (86) extending radially from said upper shaft (76) within said frusto-conical section, said scraping blades being inclined to the horizontal so as to move the material downwardly.

* * * * *